United States Patent [19]

Margalit et al.

[11] 4,332,869
[45] Jun. 1, 1982

[54] METAL-RICH IRON SULFIDE CATHODE MATERIAL

[75] Inventors: Nehemiah Margalit, Chester; Ashok V. Joshi, Fishkill; Wesley E. Aker, Chester, all of N.Y.; Dennis P. Johnson, Madison, Wis.

[73] Assignee: Ray-O-Vac Corporation, Madison, Wis.

[21] Appl. No.: 186,585

[22] Filed: Sep. 12, 1980

[51] Int. Cl.$^3$ .............................................. H01M 4/02
[52] U.S. Cl. .................................. 429/194; 429/218; 429/221
[58] Field of Search ............... 429/221, 194, 197, 196, 429/103, 218; 252/182.1, 519; 423/138, 511

[56] References Cited

U.S. PATENT DOCUMENTS

| | | | |
|---|---|---|---|
| 3,907,589 | 9/1975 | Gay et al. | 429/221 X |
| 4,078,120 | 3/1978 | Lindstrom | 429/221 X |
| 4,084,045 | 4/1978 | Kegelman | 429/221 X |
| 4,164,069 | 8/1979 | Tomezuk | 429/221 X |
| 4,189,529 | 2/1980 | Birt et al. | 429/103 |
| 4,250,236 | 2/1981 | Haschka et al. | 429/221 |

FOREIGN PATENT DOCUMENTS 55-001090  7/1980  Japan .

OTHER PUBLICATIONS

Uetani et al., Preparation of Iron Sulfides etc., Journal of Power Sources, pp. 89–98, vol. 5, No. 1, Mar. 1980.

*Primary Examiner*—Anthony Skapars
*Attorney, Agent, or Firm*—Raymond J. Kenny; Francis J. Mulligan, Jr.

[57] ABSTRACT

An electrolytic cell having an active metal anode, an electrolyte compatible with the anode metal and a cathode of metal-rich iron sulfide said cathode being substantially devoid of sulfur-rich phases. An example of such a cell is Li/1M LiAsF$_6$ dissolved in 50% propylene carbonate—50% dimethoxyethane/Fe$_{1.2}$S. The invention also includes such cathodes per se.

6 Claims, No Drawings

METAL-RICH IRON SULFIDE CATHODE MATERIAL

The present invention is concerned with electrochemical cells and more particularly with electrochemical cells having an iron sulfide cathode.

PRIOR ART AND PROBLEMS

Prior proposals for electrochemical cells such as lithium/iron sulfide have contemplated the use of stoichiometric or sulfur-rich iron sulfides as cathode materials. The use of these materials results in high apparent open circuit voltages and, often, an initial high voltage plateau when the cells are discharged. This behavior is undesirable when such cells are employed to power voltage-sensitive electronic circuits.

DISCOVERY AND PRESENT INVENTION

It has now been discovered that when metal (iron)-rich iron sulfides having a formula of $Fe_{(1+x)}S$ wherein x is a number from about 0.05 to 0.2, are used as cathodes the resultant cells exhibit an initial open circuit potential closer to the theoretical open circuit potential than similar cells employing prior art iron sulfide cathode materials.

OBJECTS OF THE INVENTION

It is an object of the present invention to provide a novel electrochemical cell employing a metal-rich iron sulfide cathode.

Another object of the invention is to provide a novel iron sulfide cathode adapted to be employed in an electrochemical cell.

A further object of the invention is the provision of a process for making the novel cathodes of the present invention.

Other objects and advantages will become apparent from the following description.

GENERAL DESCRIPTION OF THE INVENTION

The present invention contemplates, as a cathode for an electrochemical cell, a mass of metal-rich iron sulfide having a formula of $Fe_{(1+x)}S$ wherein x is a number from about 0.05 to about 0.2 and said mass being substantially devoid of sulfur-rich phases. Advantageously x has a value of about 0.1 to about 0.2. Such cathodes are conveniently made by mixing together powders of an iron sulfide and metallic iron in a proportion to provide a composition of about $Fe_{(1+x)}S$ as hereinbefore defined and interdiffusing (sintering) the mixture to substantially eliminate from the sintered mass any phase containing $FeS_y$, y being defined as a number at least as great as 1. Advantageously, sintering (interdiffusion) is carried on by firing at a temperature of at least 500° C. under an inert atmosphere for at least about 15 minutes, for example at 600° C. to 800° C. for 30 minutes. Of course, if desired the cathode material of the present invention can be made directly from the elements iron and sulfur in the proportions as required by the formula defining the chemical composition of the cathode material of the invention.

It is believed, as a matter of theory, that abnormally high open circuit voltages and initial high voltage plateaus upon discharge are caused by the presence in prior art iron sulfide cathodes of sulfur-rich phases i.e., phases having compositions represented by the formula $FeS_y$, where y is a number greater than 1. While the basis of the present invention is considered to be the elimination of such phases, applicants do not wish to be limited to this theory but rather describe the present invention in terms of a product and the production of a product devoid of such phase or phases by a process which eliminates such phases, regardless of whether the elimination of such phases is the cause of improved results or merely an attendant phenomenon.

The present invention also contemplates electrochemical cells containing as an anode an active metal such as sodium, lithium and the like, a conventional electrolyte compatible with such an anode and an iron sulfide cathode as defined hereinbefore. A specific example of such a cell includes lithium as an anode, a solution of $LiAsF_6$ in an inert solvent as an electrolyte and the metal-rich iron sulfide cathode of the invention.

SPECIFIC EXAMPLE

Cathode materials of the present invention were made by grinding together $Fe_{0.9}S$ powder with metallic iron powder to form a ground mixture having a composition equivalent to the formula $Fe_{1.2}S$. The ground mixture was then formed into slugs and the slugs were heat treated under an inert atmosphere for one half hour some at 600° C. and others at 800° C. The thus sintered, interdiffused slugs were then ground, the ground powder was formed into cathode and the cathodes were included in button cells having a lithium anode and an electrolyte comprising a 1 mole solution of $LiAsF_6$ dissolved in 50% propylene carbonate—50% dimethoxyethane. These cells were all prepared in a dry argon atmosphere. The following Table compares the open circuit voltages after various periods of time of these cells with the open circuit voltages of similar cells, identical except that nondiffused (unfired) cathode material of identical composition was used.

TABLE

| Time (Hr) | OCV (Volts) Fired Pellets | OCV (Volts) Unfired Pellets |
| --- | --- | --- |
| 1 | 1.763 | 2.735 |
| 24 | 1.807 | 2.617 |
| 140 | 1.896 | 2.579 |
| 212 | 1.904 | 2.565 |
| 380 | 1.895 | 2.548 |

The Table shows that the open circuit voltages of the cells containing the fired metal-rich iron sulfide cathodes are stable and much closer to the theoretical OCV of $\leq 1.7$ than the open circuit voltages of cells having as cathodes mere mixtures of iron and sulfur-rich iron sulfide.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A cathode material having a formula of $Fe_{(x+1)}S$ wherein x is a number from about 0.05 to about 0.2, said cathode material being substantially devoid of sulfur-rich phases.

2. A cathode material as in claim 1 wherein x is a number from about 0.1 to about 0.2.

3. A cathode material as in claim 1 wherein x is about 0.2.

4. An electrochemical cell including an active metal anode, an electrolyte compatible with said active metal and a cathode having a formula of $Fe_{(1+x)}S$ wherein x is a number from about 0.05 to about 0.2, said cathode material being substantially devoid of sulfur-rich phases.

5. An electrochemical cell as in claim 4 wherein the chemical formula of the cathode includes as a value of x a number from about 0.1 to about 0.2.

6. An electrochemical cell as in claim 4 wherein the active metal is lithium.

* * * * *